United States Patent
Wockener

[11] 3,898,024
[45] Aug. 5, 1975

[54] APPARATUS FOR REGULATING THE BEAD HEIGHT IN THE ROLL GAP OF A CALENDER TO WHICH MATERIAL TO BE CALENDERED IS FED FROM A PRE-PLASTIFYING MACHINE

[75] Inventor: Willi Wockener, Hannover-Kleefeld, Germany

[73] Assignee: Hermann Berstorff Maschinenbau GmbH, Hannover-Kleefeld, Germany

[22] Filed: Aug. 30, 1973

[21] Appl. No.: 393,020

[30] Foreign Application Priority Data
Sept. 6, 1972   Germany............... 2243751

[52] U.S. Cl. ......... 425/145; 425/DIG. 235; 425/169
[51] Int. Cl.² ........................................... B29C 3/06
[58] Field of Search ........ 425/145, 147, 171, 174.2, 425/363, DIG. 235, 169, 194; 73/290 V

[56] References Cited
UNITED STATES PATENTS
2,960,678   11/1960   Beard et al. .................. 73/290 V
3,609,801   10/1971   Skarman et al. .............. 425/147

Primary Examiner—Francis S. Husar
Assistant Examiner—Robert J. Charvat
Attorney, Agent, or Firm—Donald D. Jeffery

[57] ABSTRACT

Apparatus for regulating the bead height in the roll gap of a calender to which material to be calendered is fed from a pre-plastifying machine, preferably by a conveyor, wherein an ultrasonic transmitter is provided to direct sound waves onto the bead and an ultrasonic receiver is provided to receive the reflected sound waves, and the output speed of the pre-plastifying machine, and the speed of the conveyor if provided, is regulated by means controlled by the receiver to maintain the bead height at a desired value.

1 Claim, 3 Drawing Figures

APPARATUS FOR REGULATING THE BEAD HEIGHT IN THE ROLL GAP OF A CALENDER TO WHICH MATERIAL TO BE CALENDERED IS FED FROM A PRE-PLASTIFYING MACHINE

The invention relates to apparatus for regulating the bead height in the roll gap of a calender to which material to be calendered is fed from a pre-plastifying machine, for example an extruder, rolling mill or the like, if necessary over a conveyor apparatus.

German Offenlegungschrift No 1,504,722 shows apparatus for this purpose, with sensing means which dips into and monitors the bead in the roll gap of a calender. This sensing means produces a signal which corresponds to the amount of the accumulated material or of the bead of material. This signal is compared with a reference signal which corresponds to a particular optimum value of the bead size.

In the event of a difference between the two signals, a control signal is produced, which, with the interpolation of further elements and conversion into a pneumatic signal, acts in a controlling manner upon the roll gap. If the bead in the roll gap is too large, then the gap width is suitably increased and vice versa, whereby it is achieved that more material flows through the roll gap and the bead correspondingly is made smaller and/or is reduced in size. Of course, it is also possible to act upon conveyor apparatus in such manner that less material is fed to the roll gap.

Such apparatus, however, has serious disadvantages. A substantial disadvantage resides in the danger of the sensing means being entrained by the bead, into which the sensing means dips, and pulled into the roll gap and broken there, whereby damage to the rolls and impurities in the material occur. Also, the sensing means makes marks in the bead, which can remain visible on the finished material such as a film.

Moreover, the sensing means can be spoilt, or anyway at least damaged, by contact with the kneaded material and by the action of heat.

According to the invention there is provided apparatus for regulating the bead height in the roll gap of a calender to which material to be calendered is fed from a pre-plastifying machine, comprising an ultrasonic transmitter to direct sound waves onto the bead; an associated ultrasonic receiver to receive sound waves emanating from the transmitter and reflected from the bead and means controlled by said receiver to increase or reduce the output speed of the pre-plastifying machine in accordance with the height of the bead.

Advantageously the pre-plastifying machine is a rolling mill or an extruder and the material to be calendered is fed from the pre-plastifying machine to the roll gap by a conveyor, said menas also controlling the speed of the conveyor.

Preferably the ultrasonic transmitter and ultrasonic receiver are disposed above the bead and spaced at a distance therefrom.

Suitably, several ultrasonic transmitters and ultrasonic receivers are spaced apart from one another across the width of the bead.

In the apparatus according to the invention, the danger of regulating- or measuring-apparatus coming into contact with the kneaded material is completely avoided.

The invention is diagrammatically illustrated by way of example in the accompanying drawing, in which.

Figure 1:
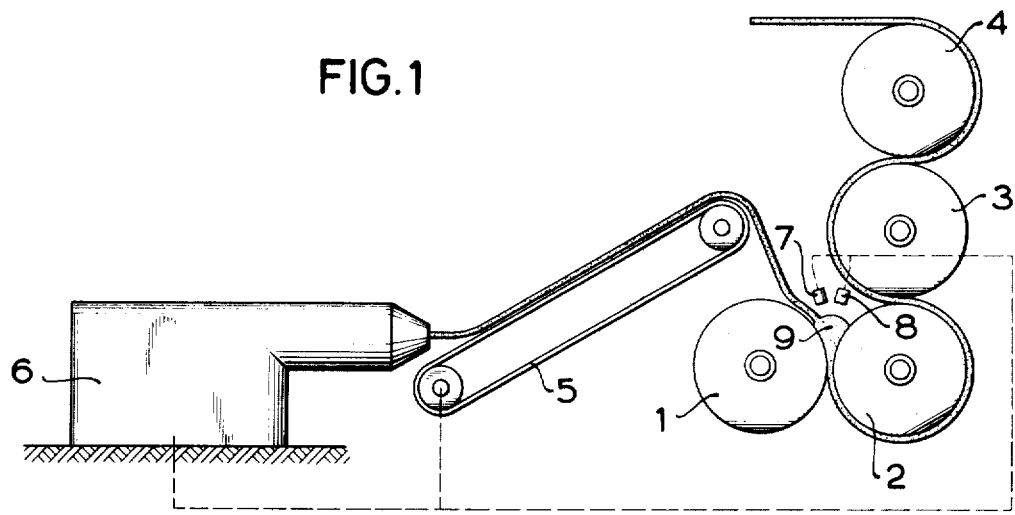
FIG. 1 is a view of an L-calender provided with the apparatus according to the invention.

Referring to the drawing, FIG. 1 shows an L-calender having rolls 1 to 4. Disposed before this L-calender is a conveyor 5, which is charged from a pre-plastifying machine, as shown an extruder 6 with material which is in the form of a strip.

This material is supplied, in known manner, to the gap between the two rolls 1 and 2 to form a bead 9.

During operation, it frequently occurs that the bead 9, of the kneaded material in the gap between the two rolls 1 and 2, becomes too large and can cause air to be enclosed in the material, thereby adversely affecting the quality of the finished product.

Conversely, if the bead 9 of kneaded material in the roll gap is too small, the tendency arises for the film to tear, on the calender roller.

Figure 2:
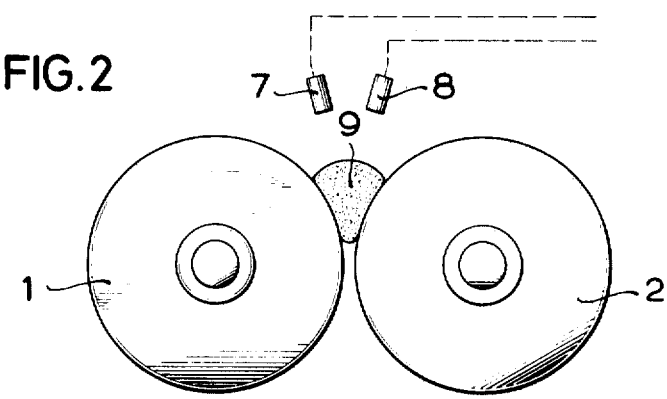
FIG. 2 is a view on an enlarged scale of two rolls of the calendar according to FIG. 1, and the apparatus according to the invention.

According to the form of embodiment in accordance with FIGS. 1 and 2, the apparatus comprises an ultrasonic transmitter 7 and an ultrasonic receiver 8, which are arranged above the bead 9 of kneaded material in the gap between the two rolls 1 and 2 and spaced at a distance therefrom.

The ultrasonic transmitter 7 transmits, in known manner, sound waves of high frequency, which are reflected by the bead 9 and are picked up by the receiver 8. The greater is the height of bead 9, the smaller is the path of travel of the sound waves from the transmitter 7 to the bead 9 and to the receiver 8, and thus the shorter is the time between emission of the sound waves and reception after reflection.

Conversely, if the height of the bead 9 is lower, then the emission to reception time of the sound waves is correspondingly longer.

Means controlled by the receiver 8 acts upon the extruder 6 and the conveyor apparatus 5, in such manner that, in the event of the bead 9 being too low in height, the output speed of the extruder 6 and simultaneously also the conveying speed of the conveyor apparatus 5, are increased. If, on the other hand, the height of the bead 9 is too great, then the receiver 8 acts upon the extruder 6 and the conveyor apparatus 5 in delaying manner.

The particular form of such means, whereby sound waves picked up by the receiver 8 can be converted into electrical or pneumatic pulses or signals, which in turn act upon corresponding switching devices, drive motors, and the like, of the extruder 6 and of the conveyor apparatus 5, are sufficiently known to the expert. Therefore, they do not form part of the subject matter of the invention and no further details need be given regarding them. Suitably, one will start out from a reference value, i.e. a reference signal, which corresponds to the normal height of the bead 9 in the roll gap. The actual value of the bead 9 is determined by the receiver 8 and is converted into a corresponding electrical or pneumatic value. By differentiation between the two values, the control signal or the control value is produced, which correspondingly comes to act upon the extruder 6 and the conveyor apparatus 5, through an amplifier, transformer, and the like.

Figure 3:
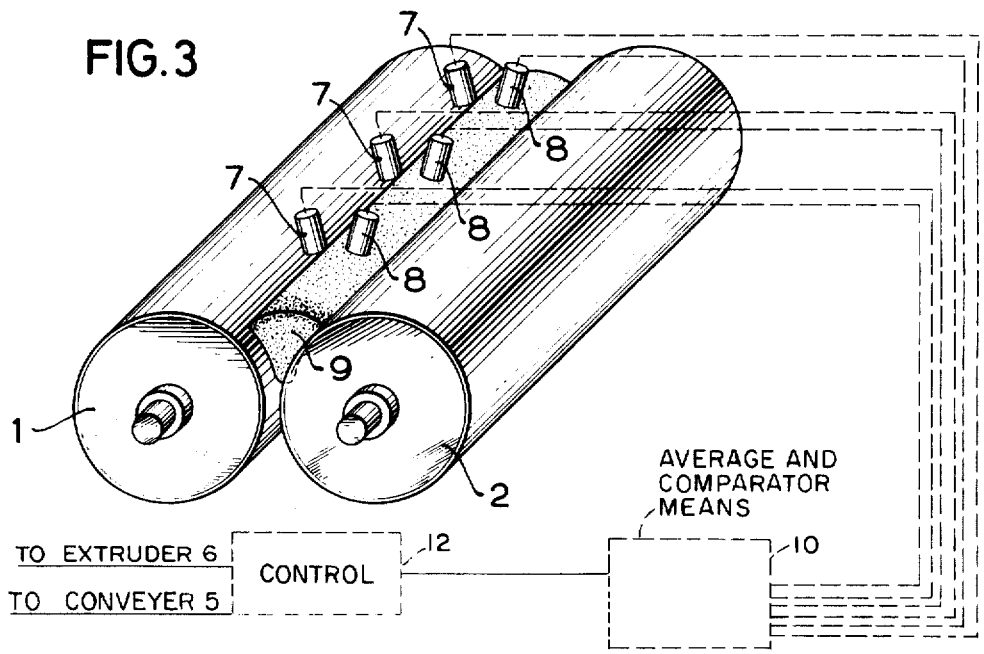
FIG. 3 is a perspective view of apparatus according to the invention.

FIG. 3 shows that several ultrasonic transmitters 7 and ultrasonic receivers 8, can be used lying adjacent one another but spaced apart across the width of the bead 9. The transmitters 7 and receivers 8 can be switched in such manner that an actual value is obtained by averaging the individual measured values in average and comparator means 10. Such an averaged value, converted into a signal, a pulse or the like, then is compared in the average and comparator means 10 with the reference value whereby, in its turn, the difference between these two values results in the control value. The latter is relayed to control 12 which controls the extruder 6 and conveyor 5 as above described.

What is claimed is:

1. Apparatus for regulating the bead height in the roll gap of a calender to which material to be calendered is fed by a conveyor from a pre-plastifying machine, comprising several ultrasonic transmitters spaced apart above and across the width of the bead to direct ultrasonic waves onto the bead; several associated ultrasonic receivers spaced above said bead and across from said transmitters to receive sound waves emanating from said transmitters and reflected from the bead, and means controlled by the receivers to increase or reduce the output speed of said pre-plastifying machine and the speed of said conveyor in accordance with the height of the bead, said control means including means operatively connected to said transmitters and receivers for averaging the individual measured values derived from each associated pair of transmitters and receivers and producing an averaged signal, and means for comparing said averaged signal with a known reference signal thereby to increase or reduce the output speed of said pre-plastifying machine and the speed of said conveyor.

* * * * *